United States Patent
Lin et al.

(10) Patent No.: US 8,251,564 B2
(45) Date of Patent: Aug. 28, 2012

(54) LIGHT GUIDE PLATE AND BACKLIGHT SOURCE HAVING SAME

(75) Inventors: I-Thun Lin, Taipei Hsien (TW); Yung-Lun Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 277 days.

(21) Appl. No.: 12/701,719

(22) Filed: Feb. 8, 2010

(65) Prior Publication Data

US 2010/0302801 A1 Dec. 2, 2010

(30) Foreign Application Priority Data

May 26, 2009 (CN) .......................... 2009 1 0302633

(51) Int. Cl.
*F21V 7/04* (2006.01)
(52) U.S. Cl. ......... 362/621; 362/608; 362/612; 362/606
(58) Field of Classification Search .......... 362/621–626, 362/608, 612, 613, 606
See application file for complete search history.

(56) References Cited

U.S. PATENT DOCUMENTS

| | | | | |
|---|---|---|---|---|
| 7,139,048 | B2 * | 11/2006 | Han et al. .......................... | 349/62 |
| 7,223,010 | B2 * | 5/2007 | Min et al. ....................... | 362/628 |
| 2002/0071267 | A1 * | 6/2002 | Lekson et al. ................... | 362/31 |
| 2004/0207775 | A1 | 10/2004 | Min et al. | |
| 2006/0028844 | A1 * | 2/2006 | Parker ........................... | 362/613 |
| 2007/0121342 | A1 * | 5/2007 | Tamura et al. ................ | 362/608 |
| 2007/0165423 | A1 * | 7/2007 | Choi et al. ..................... | 362/621 |
| 2008/0002428 | A1 * | 1/2008 | Byun et al. .................... | 362/608 |

FOREIGN PATENT DOCUMENTS

CN 1542522 A 11/2004

\* cited by examiner

*Primary Examiner* — Julie Shallenberger
(74) *Attorney, Agent, or Firm* — Altis Law Group, Inc.

(57) ABSTRACT

An exemplary light guide plate includes an light incident surface, an light emitting surface, a number of parallel V-shaped structures, and a Fresnel lens portion. The light incident surface is configured for receiving light beams. The light emitting surface is adjacent to the light incident surface, and configured for emission of the light beams. The V-shaped grooves are defined in the light incident surface and arranged perpendicular to the light emitting surface. The Fresnel lens portion is provided on the light incident surface between each two neighboring V-shaped grooves.

16 Claims, 3 Drawing Sheets

US 8,251,564 B2

LIGHT GUIDE PLATE AND BACKLIGHT SOURCE HAVING SAME

BACKGROUND

1. Technical Field

The disclosure generally relates to light guide plates and backlight sources, and particularly to a light guide plate with Fresnel lenses and V-shaped grooves, and a backlight source using the light guide plate.

2. Description of Related Art

A typical liquid crystal display (LCD) device generally includes a backlight module and a liquid crystal panel. The backlight module includes a light guide plate and a light source. The backlight module is used to provide a surface light source for illuminating the liquid crystal panel. In operation, the light guide plate converts light beams from the light source into surface light beams, and directs the surface light beams to the liquid crystal panel.

Referring to FIG. 3, a typical backlight module 10 for a liquid crystal display device is shown. The backlight module 10 includes a light guide plate 11 and a plurality of light sources 12. The guide plate 11 generally is rectangular, and includes an light incident surface 110, and an light emitting surface 112 adjoining the light incident surface 110. The light sources 12 are arranged adjacent to the light incident surface 110. In operation, light beams emitted from the light sources 12 is projected to the light guide plate 11. The light beams is then guided in the light guide plate 11 and projected from the light emitting surface 112 of the light guide plate 11.

Light emitting diodes (LEDs) are currently used extensively as light sources 12 of the backlight module 10 due to their high luminous efficiency, low power consumption and long life span. The LEDs 13 are generally spaced from one another. Each LED 13 has a limited radiating range. For example, a single LED 13 may emit light beams with an emitting angle in a range from about 30 degrees to about 130 degrees. In such case, a plurality of bright bands 13, which have larger luminance and a plurality of dark bands 15, which have less luminance may be formed alternately on the light emitting surface 112. The light guide plate 11 may not evenly distribute the light beams over an entire light emitting surface 112 thereof.

Therefore, what is needed is a light guide plate and a backlight source using same, which provides uniform output light thereby overcoming the described limitations.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the various views.

DETAILED DESCRIPTION

Figure 1:
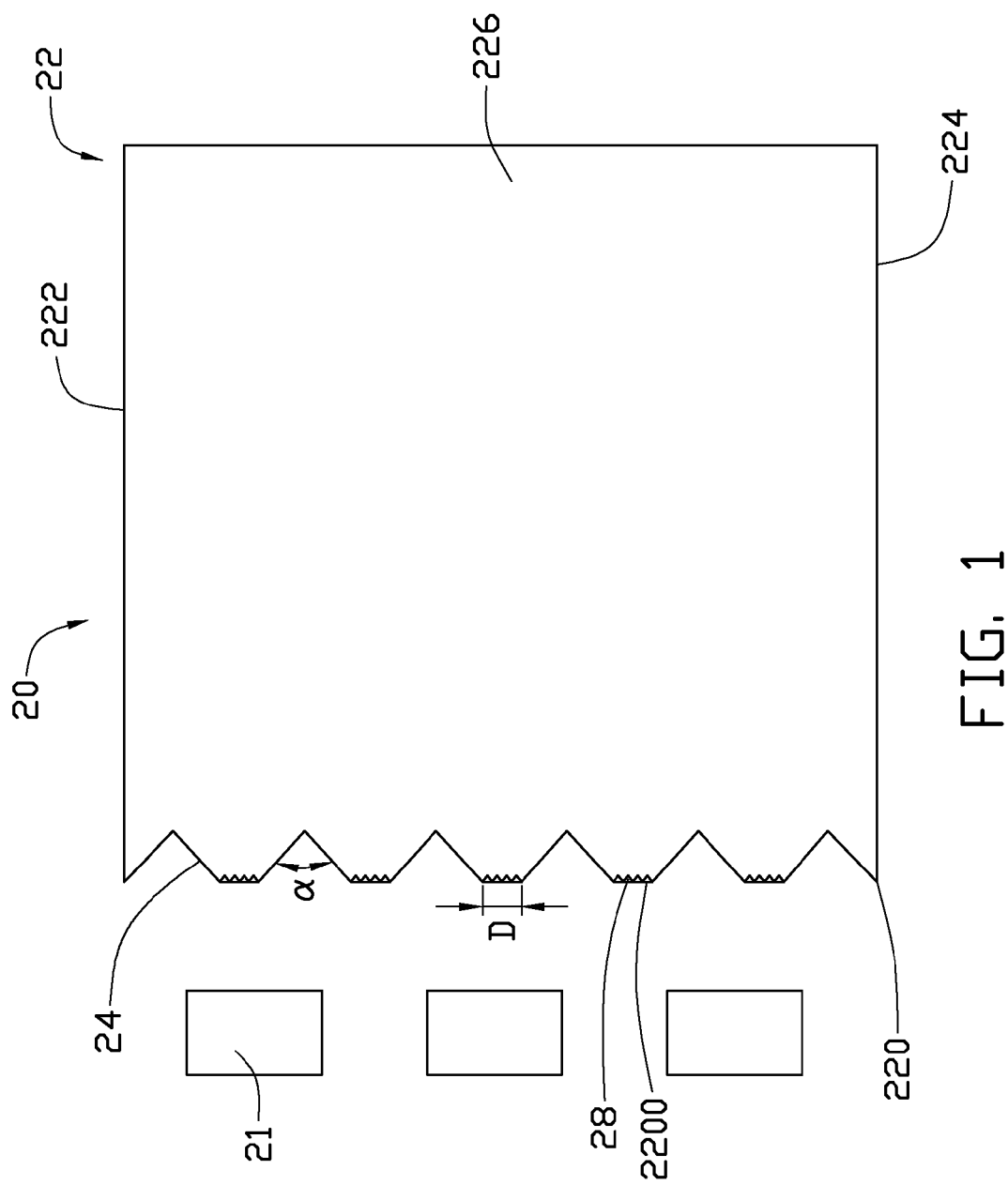
FIG. 1 is a top plan view of an exemplary embodiment of a backlight source, the backlight source utilizing a light guide plate.

Referring to FIG. 1, an exemplary embodiment of a backlight module 20 includes a plurality of light sources 21 and a light guide plate 22. The light sources 21 are configured for emitting light beams. The light guide plate 22 receives the light beams from the light source 21. The light beams are then emitted from the light guide plate 21.

Figure 2:
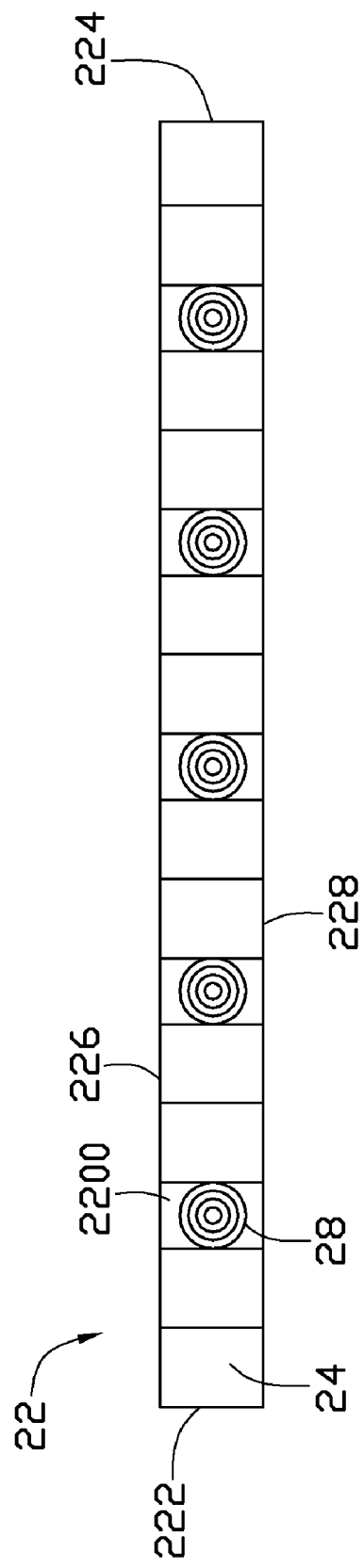
FIG. 2 is a side view of the light guide plate of FIG. 1.
Figure 3:
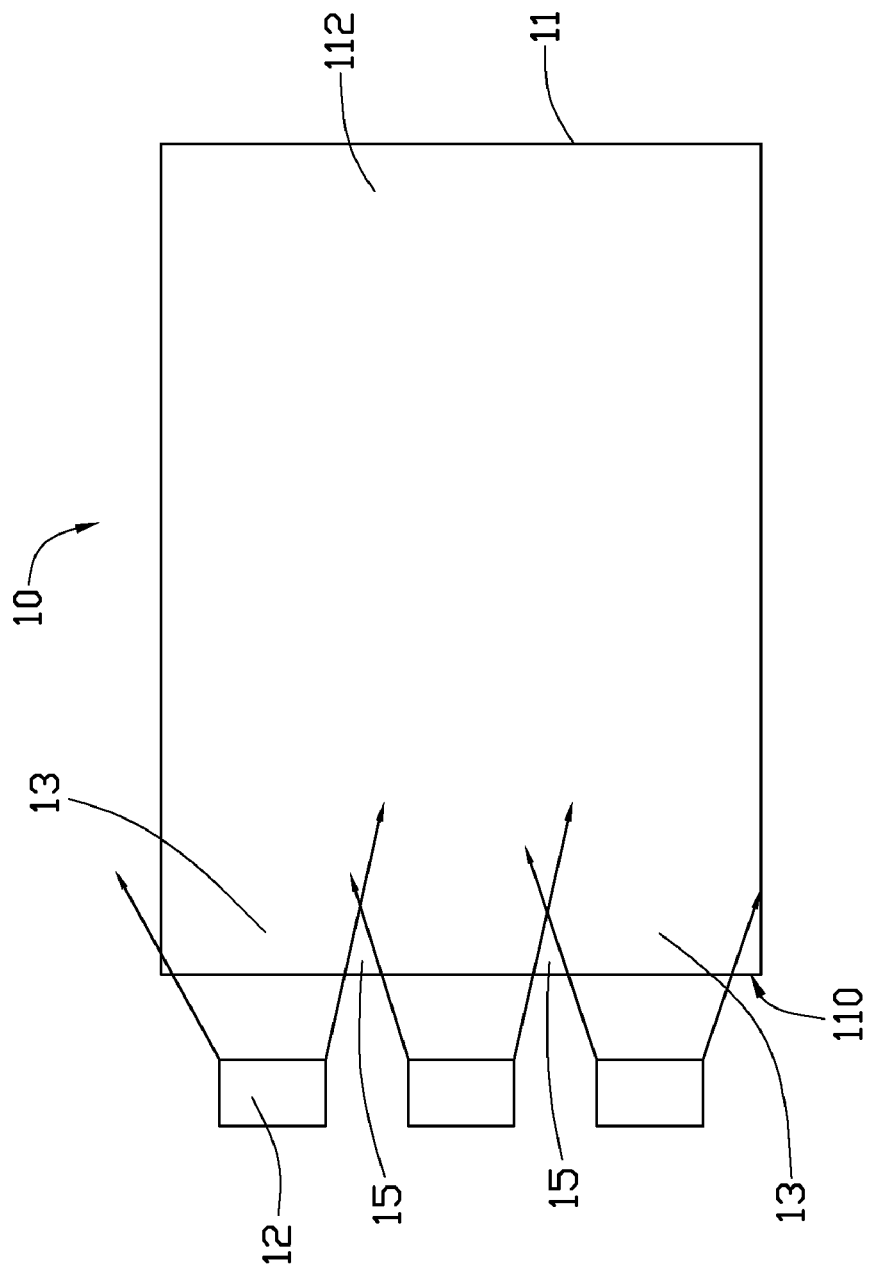
FIG. 3 is a top plan view of a typical backlight source.

Referring to FIGS. 1 and 2, a shape of the light guide plate 22 can be substantially flat or substantially wedge-shaped. In this embodiment, the light guide plate 22 is a substantially rectangular sheet having a uniform thickness, and includes a light incident surface 220, a first lateral surface 222, a second lateral surface 224, an light emitting surface 226, and a bottom surface 228. The first lateral surface 222, the second lateral surface 224, the light emitting surface 226, and the bottom surface 228 each adjoin the light incident surface 220. The first lateral surface 222 and the second lateral surface 224 are located opposite to one another, and both intersect with the light incident surface 220. For example, the first and the second lateral surfaces 222, 224 may be parallel to one another and both perpendicular to the light incident surface 220. The light emitting surface 226 interconnects the first lateral surface 222 and the second lateral surface 224. The bottom surface 228 is located opposite to the light emitting surface 226.

The light guide plate 22 can be made of light-pervious material selected from the group consisting of resin, silicone, epoxy, polyethylene terephalate, polymethyl methacrylate, and polycarbonate. Alternatively, the light guide plate 22 may be made of other suitable materials, such as glass.

The light incident surface 220 of the light guide plate 22 has a plurality of parallel V-shaped grooves 24 defined therein. Each of the V-shaped grooves 24 extends from the light emitting surface 226 to the bottom surface 228. Preferably, a vertex angle α of each V-shaped groove 24 is in a range from 20 degrees to 120 degrees. The V-shaped grooves 24 are located in sequence from either of the first and the second lateral surfaces 222, 224 to the other first or second lateral surfaces 222, 224, and are spaced from one another. A surface region 2200 of the light incident surface 220, which does not have the V-shaped groove 24 defined thereon is located between each two neighboring V-shaped grooves 24. A distance D of the surface region 2200 along a direction from the first lateral surface 222 to the second lateral surface 224 (or from the second lateral surface 224 to the first lateral surface 222) is defined between each two neighboring V-shaped grooves 24. The distance D of the surface region 2200 between any two neighboring V-shaped grooves 24 may be same as the distance of the surface region 2200 between any other two neighboring V-shaped grooves 24. Alternatively, the distance D of the surface region 2200 between any two neighboring V-shaped grooves 24 may vary along the direction from the first lateral surface 222 to the second lateral surface 224 (or from the second lateral surface 224 to the first lateral surface 222). The variation may be gradient variation. In one example, the distance D of the surface region 2200 between any two neighboring V-shaped grooves 24 firstly increases and then decreases along the direction from the first lateral surface 222 to the second lateral surface 224 (or from the second lateral surface 224 to the first lateral surface 222). In another example, the distance D of the surface region 2200 between any two neighboring V-shaped grooves 24 firstly decreases and then increases along the direction from the first lateral surface 222 to the second lateral surface 224 (or from the second lateral surface 224 to the first lateral surface 222).

Each surface region 2200 has a Fresnel lens portion 28 defined thereon. In this embodiment, the light incident surface 220 includes five surface regions 2200 thereon. Thus, each of the five Fresnel lens portions 28 is provided on a corresponding surface region 2200. In addition, each of the five Fresnel lens portions 28 includes a plurality of concentric-annular grooves (not labeled) formed on the corresponding surface region 2200. Preferably, a depth of each groove in the Fresnel lens portion 28 is smaller than that of each V-shaped groove 24.

The light sources 21 are arranged adjacent to the light incident surface 220 in sequence along the direction from the first lateral surface 222 to the second lateral surface 224 (or from the second lateral surface 224 to the first lateral surface 222). Each of the light sources 21 can be a light emitting diode (LED). Alternatively, each light source 21 can be a miniature bulb.

In operation, light beams emitted from the light sources 21 enter into the light guide plate 22 through the light incident surface 220. The V-shaped grooves 24 and the Fresnel lens portions 28 increase radiating range of the light beams when the light beams enter the light incident surface 220. The light beams are then mixed in the light guide plate 22, and exit from the entire light emitting surface 226. Therefore, the backlight module 20 provides substantially uniform output light.

It is to be understood that the above-described embodiment is intended to illustrate rather than limit the disclosure. Variations may be made to the embodiment without departing from the spirit of the disclosure as claimed. The above-described embodiment illustrates the scope of the disclosure but do not restrict the scope of the disclosure.

What is claimed is:

1. A light guide plate comprising:
a light incident surface configured for receiving light beams;
a light emitting surface being adjacent to the light incident surface, and configured for emission of the light beams;
a plurality of parallel V-shaped grooves defined in the light incident surface and arranged perpendicular to the light emitting surface;
a Fresnel lens portion provided on the light incident surface between each two neighboring V-shaped grooves; and
a first lateral surface and a second lateral surface opposite to the first lateral surface, the first lateral surface and the second lateral surface adjoining the light incident surface, the separation spacing between the V-shaped grooves varying along a direction from the first lateral surface and the second lateral surface.

2. The light guide plate of claim 1, wherein each of the Fresnel lens portions comprises a plurality of concentric annular grooves defined in the light incident surface.

3. The light guide plate of claim 2, wherein a depth of each groove in the Fresnel lens portion is smaller than that of each V-shaped groove.

4. The light guide plate of claim 1, wherein a vertex angle of each V-shaped groove is in a range from 20 degrees to 120 degrees.

5. The light guide plate of claim 1, wherein the light guide plate is wedge-shaped or has a uniform thickness.

6. The light guide plate of claim 1, wherein the separation spacing increases gradiently along a direction from the first lateral surface and the second lateral surface.

7. The light guide plate of claim 6, wherein the separation spacing increases along directions from opposite lateral peripheries of the light guide plate to a center thereof.

8. The light guide plate of claim 6, wherein the separation spacing decreases along directions from opposite lateral peripheries of the light guide plate to a center thereof.

9. A backlight source comprising:
a light guide plate comprising:
a light incident surface configured for receiving light beams,
a light emitting surface being adjacent to the light incident surface, and configured for emission of the light beams,
a plurality of parallel V-shaped grooves defined in the light incident surface and arranged perpendicular to the light emitting surface, and
a Fresnel lens portion provided on the light incident surface between each two neighboring V-shaped grooves; and
a plurality of light sources arranged opposite to the light incident surface of the light guide plate for emitting the light beams;
wherein the light guide plate further comprises a first lateral surface and a second lateral surface opposite to the first lateral surface, the first lateral surface and the second lateral surface adjoining the light incident surface, the separation spacing between the V-shaped grooves varying along a direction from the first lateral surface and the second lateral surface.

10. The backlight source of claim 9, wherein each of the Fresnel lens portions comprises a plurality of concentric annular grooves defined in the light incident surface.

11. The backlight source of claim 10, wherein each light source comprises a light emitting diode.

12. The backlight source of claim 9, wherein a vertex angle of each V-shaped groove is in a range from 20 degrees to 120 degrees.

13. The backlight source of claim 9, wherein the light guide plate is wedge-shaped or has a uniform thickness.

14. The backlight source of claim 9, wherein the separation spacing increases gradiently along a direction from the first lateral surface and the second lateral surface.

15. The backlight source of claim 14, wherein the separation spacing increases along directions from opposite lateral peripheries of the light guide plate to a center thereof.

16. The backlight source of claim 14, wherein the separation spacing decreases along directions from opposite lateral peripheries of the light guide plate to a center thereof.

* * * * *